United States Patent [19]

Albers et al.

[11] Patent Number: 4,505,558

[45] Date of Patent: Mar. 19, 1985

[54] METHOD OF MODIFYING PROJECTED IMAGES

[75] Inventors: Francis G. Albers, Ormond Beach; Fernando B. Neves, Daytona Beach, both of Fla.

[73] Assignee: General Electric Company, Syracuse, N.Y.

[21] Appl. No.: 579,920

[22] Filed: Feb. 14, 1984

[51] Int. Cl.³ .............. G03B 21/14; G03B 37/04; G03B 41/00
[52] U.S. Cl. .................. 354/4; 354/354; 352/41; 352/69; 353/30; 353/97
[58] Field of Search ........... 352/39, 41, 44, 69–71, 352/131, 132; 354/4, 20, 354; 353/20, 30, 97; 355/71, 77, 52; 350/314; 362/293, 311, 351

[56] References Cited

U.S. PATENT DOCUMENTS

| | | | |
|---|---|---|---|
| 2,004,798 | 6/1935 | Poser | 352/41 X |
| 2,544,116 | 3/1951 | Waller et al. | 352/71 |
| 2,610,544 | 9/1952 | Waller et al. | 353/30 |
| 3,088,366 | 5/1963 | Petrov et al. | 352/71 |
| 3,233,509 | 2/1966 | Swiggett | 355/77 |

*Primary Examiner*—William B. Perkey
*Attorney, Agent, or Firm*—Carl W. Baker; Richard V. Lang

[57] ABSTRACT

A method of modifying projected images is disclosed wherein light is projected on a screen in a manner which provides information concerning the desired characteristics of the image. The parameters of optical attenuators required to obtain the desired image are derived by exposing a section of light sensitive material to light from the screen while the section is situated at an intermediate image plane in the optical system of at least one projector. Subsequently, the exposed section is processed to recite the information recorded thereon visible. The desired characteristics of a field stop attenuator are obtained by modifying the shape of the projected image to the shape desired. The desired characteristics of a neutral density attenuator are obtained by modifying the intensity of the projected image to that desired. The method may be used with either single-channel or multi-channel projection apparatus.

13 Claims, 10 Drawing Figures

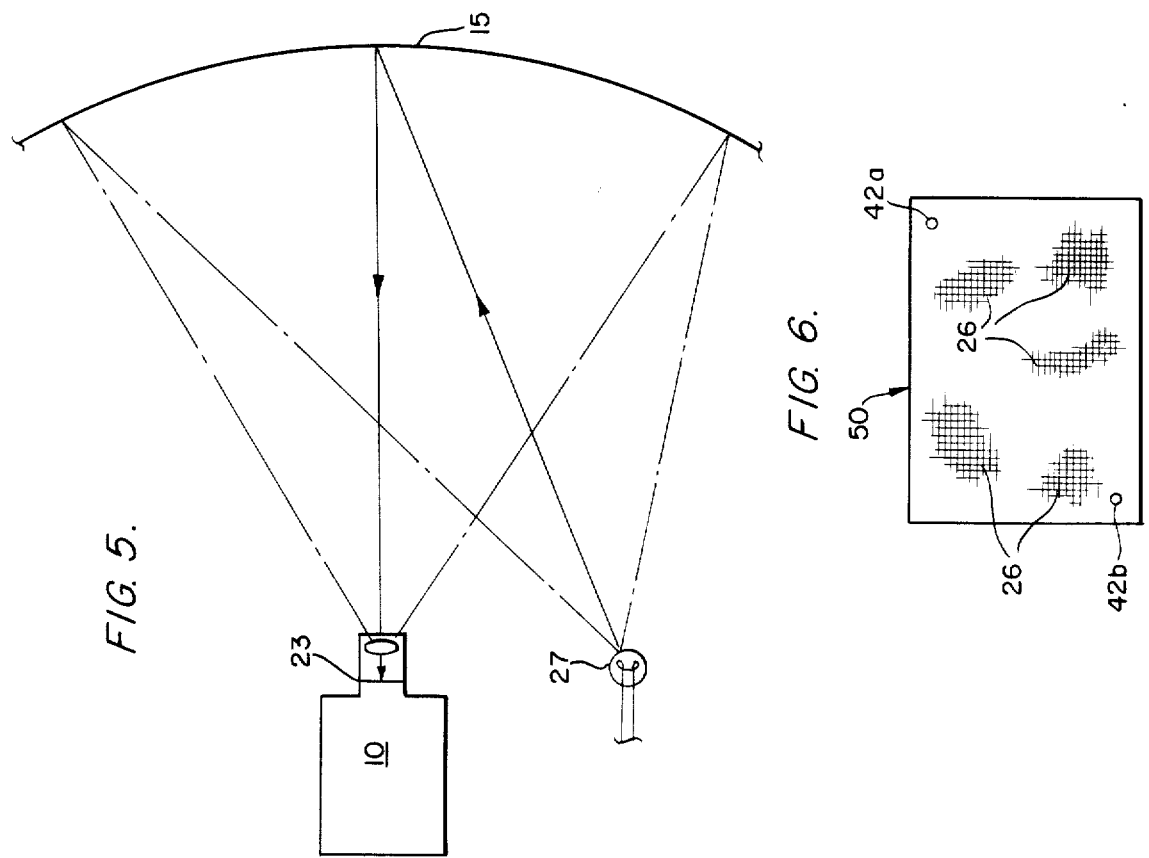
FIG. 5.
FIG. 6.
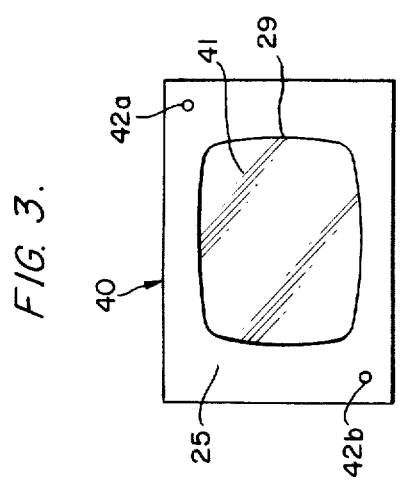
FIG. 3.
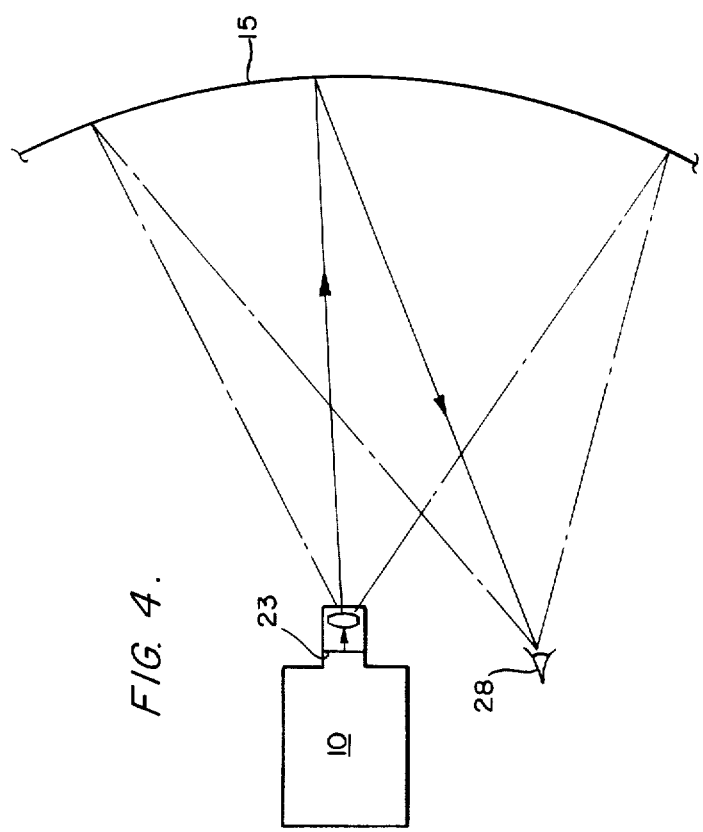
FIG. 4.

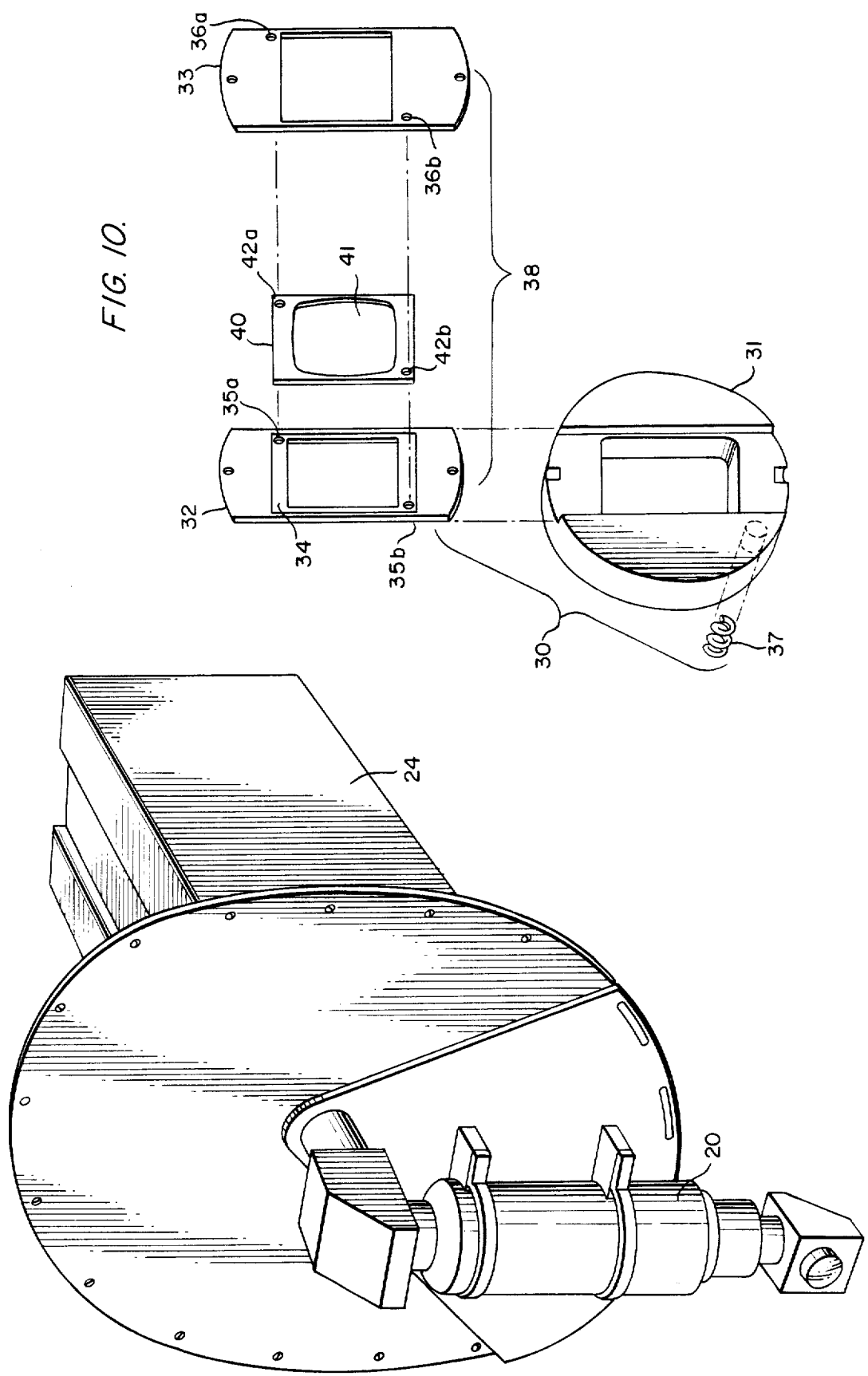

METHOD OF MODIFYING PROJECTED IMAGES

The present invention relates in general to the projection of images and more specifically to a method for modifying the images projected by one or more channels of image projection apparatus to provide them with desired characteristics.

BACKGROUND OF THE INVENTION

It is well known in the art that images projected by the optical system of image projection apparatus may be modified in order to improve the quality of the observed picture. Such modification may be carried out by attenuating the projected light in an intermediate image plane of a single optical system, or in a plurality of optical systems in multi-channel projection apparatus. Attenuators which perform these functions may modify either the shape, or the intensity, or both, of the projected images, or of portions thereof. Collectively they may be referred to as optical attenuators, or more specifically as field stop attenuators or neutral density attenuators.

Multi-channel display apparatus is widely used where a picture having a wide field of view and improved resolution is desired. In such apparatus separate image areas are projected onto a common screen by separate optical systems. The separate images are usually juxtaposed to form a continuous, wide field of view image. For example, a domed screen may be used onto which a highly realistic image with wide panorama can be projected for training aircraft pilots.

A recurring problem in present day multi-channel display apparatus is the control by the boundaries of the separate image areas projected by the respective optical systems, such that there is no overlap and no gap between adjacent image areas on the screen. The size and shape of the image area projected to the common screen by each optical system is controlled by a field stop attenuator. A portion of the total attenuator area is apertured, the remainder being opaque. The apertured and opaque areas together determine the shape of the image on the screen. As used herein, the term "apertured" or "aperture" means an area, which may or may not be an actual hole in the attenuator, but which is capable of transmitting light substantially without attenuation. The term "opaque" refers to the ability of an area to block the transmission of light. In this application, the field stop attenuator is located in an intermediate image plane of the optical system, so as to sharply delineate the image periphery and prevent the edges of the image area from appearing faded or blurred on the screen. It will be understood that field stop attenuators may also be used in single-channel display apparatus to control the shape of a projected image.

Currently used methods for providing field stop attenuators that have apertures of the desired configuration, i.e. which are configured to avoid overlap or gaps between adjacent image areas on the screen, entail a largely iterative procedure. Initially, a field stop attenuator is provided in each channel having an aperture configured slightly smaller than that required to follow some analytical prediction. The aperture is then enlarged to the desired configuration by a process of trial and error.

For exammple, a field stop attenuator made of a brass foil, with an aperture slightly smaller than the predicted aperture configuration, may be inserted at an intermediate image plane in the optical system for each channel in a multi-channel display apparatus. Gaps between adjacent image areas, which exist because the apertures are too small, are visually determined by projecting the respective images produced by the optical systems onto a common display area or screen. The field stop attenuators are subsequently removed and their apertures are enlarged by trimming where needed. Following the re-insertion of the field stops, a further visual check is made for the existence of gaps or overlap.

This trial and error process, which requires a relatively high degree of skill to carry out successfully, continues until the desired image area boundaries are obtained, e.g. until adjacent image areas share a common boundary. The procedure is lengthy and hence expensive and prone to error. Furthermore, the technique is cumbersome and to some extent error-intolerant. For example, image overlap, which results when the predicted aperture configuration turns out to be too large, or when the aperture is erroneously enlarged too much, can be corrected only by replacing the field stop attenuator in question with one having a smaller aperture and starting the trial and error process again.

Attenuators of a different kind are used in the intermediate image plane of an optical system to provide uniformity of brightness across the projected image. Non-uniformity in the brightness of an image, as perceived by an observer, may result from the specific positional relationship of the projector and the observer, the shape and coating of the screen, as well as the lens transmission characteristics of the optical system(s). To provide an image whose brightness is more perfectly uniform, it is known to use a neutral density attenuator in order to attenuate the brighter portions of the observed image. In a commonly used prior art method for obtaining an equalized brightness flat field image, the coating on the screen is selectively altered to provide the requisite attenuation on defined areas of the screen. Such a technique is subject to inefficiency, high cost and an undue expenditure of time.

OBJECTS OF THE INVENTION

It is a principal object of the present invention to provide a new and improved method for modifying the images projected by one or more channels of image projection apparatus, which method is not subject to the foregoing disadvantages.

It is another object of the present invention to provide a new and improved method for providing field stop attenuators for use in the respective optical systems of multi-channel display apparatus, which cause adjacent image areas to meet at a common boundary with a high degree of accuracy.

It is an additional object of the new and improved method in accordance with the present invention to provide a field stop attenuator in the optical system of a single-channel display apparatus for accurately controlling the shape of the image area.

It is a further object of the new and improved method in accordance with the present invention to provide a neutral density attenuator in a projection system which presents a flat field image of uniform brightness to an observer.

SUMMARY OF THE INVENTION

These and other objects of the present invention are achieved through a method whereby the optical system(s) of a display apparatus are initially provided with a section of light-sensitive material, e.g. a glass plate carrying an unexposed photographic emulsion, in the intermediate image plane of each optical system. Each glass plate is held in place in a manner which provides a position reference for the final attenuator and each is exposed to light emanating from the screen and directed to the glass plate through the corresponding optical system.

Various kinds of attenuators may be provided in accordance with the present invention by illuminating the screen in different ways. Where a field stop attenuator is to be provided, a light spot projected by a narrow beam light source, such as a laser, is used to trace the boundary of the desired image area on the screen. In the case of multi-channel projection apparatus, such tracing includes the shared boundaries, if any, of adjacent image areas. By exposing each glass plate to light emanating from the screen due to the moving light spot on the screen, a line pattern is recorded on the glass plate as a latent photographic image which corresponds to the outline traced by the light spot.

In the case of a neutral density attenuator, the screen is flooded by a light source which creates a uniform field of light thereon. The glass plate is exposed to light emanating from the screen which reaches the plate through the corresponding optical system. In the case of multi-channel display apparatus, each glass plate is exposed to light directed thereto through its corresponding optical system. The screen remains floodlighted until the photographic emulsion on that portion of the glass plate which receives light from the dimmest area of the screen has been exposed sufficiently to form a latent photographic image. Hence, the emulsion on a particular portion of the glass plate will be exposed in accordance with the brightness of light directed from each area of the screen by the optical system to that particular portion of the glass plate. A two-dimensional attenuation function is thus recorded as a latent photographic image in the emulsion on the glass plate, or on the plate of each optical system if more than one such system is employed. Subsequent processing includes developing the emulsion to fix the recorded function or pattern on the plate. Each glass plate can then be used directly to provide the desired attenuation.

In the case of a neutral density attenuator, no further processing is needed and the glass plate need only be installed in the optical system. For a field stop attenuator, however, it is necessary that the area outside the developed line pattern be opaque. Where a glass plate is used, this is conveniently accomplished by masking the outside area with paint. Subsequently the attenuator is placed in its corresponding optical system by using the aforesaid position references. The attenuation function is performed by the developed emulsion, or by the masking on the glass plate, or by both, to provide the projected image with its desired brightness and shape.

The foregoing and other objects of the present invention, together with the features and advantages thereof, will become apparent from the following detailed description of the invention when read with the accompanying drawings in which applicable reference numerals have been retained.

BRIEF DESCRIPTION OF THE DRAWINGS

FIG. 3 shows a glass plate on which a line pattern has been fixed;

FIG. 4 is a schematic plan view of exemplary display apparatus showing the location of an observer relative to the domed screen;

FIG. 5 illustrates the display apparatus of FIG. 4 in relation to the screen and a source of uniform light;

FIG. 6 shows a glass plate on which a neutral density attenuation function has been fixed;

FIG. 7 shows a single optical system of the type that may be used in the display apparatus of FIGS. 1, 4 and 5;

FIG. 10 is an exploded view of a field stop attenuator and the attenuator carrier shown in FIG. 8.

DETAILED DESCRIPTION OF THE INVENTION

Figure 1:
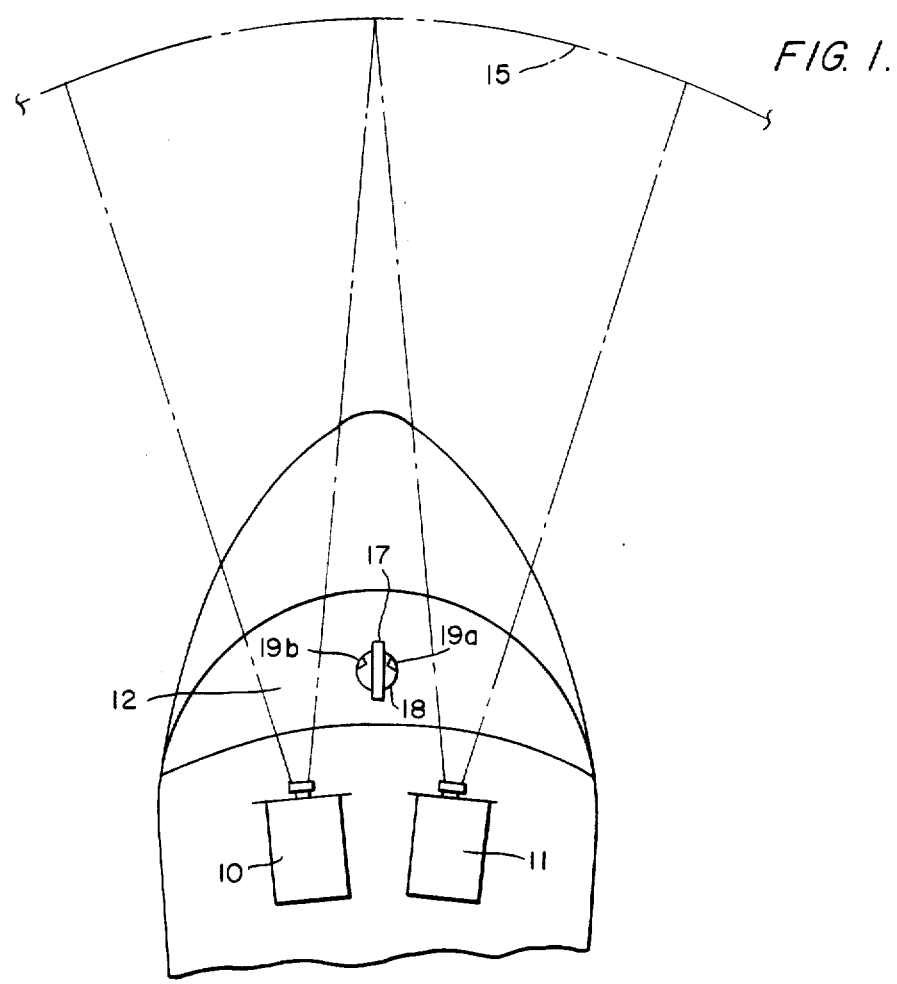
FIG. 1 is a schematic plan view of an exemplary multi-channel display apparatus using a pair of optical systems.

One embodiment of the invention relates to a method for making field stop attenuators in multi-channel display apparatus. Referring now to the drawings, FIG. 1 illustrates elements of an exemplary multi-channel display apparatus in plan view. For the sake of clarity of explanation, the apparatus shown is capable of projecting a mosaic image consisting of only two discrete image areas. It will be understood, however, that the invention is not so limited and that a larger or smaller number of optical systems may be used and deployed in any desired arrangement.

In FIG. 1, a pair of substantially identical optical systems 10 and 11 is positioned on one side of a domed screen 15, in the general vicinity of an observation area 12. A slewable laser device 17 is located in observation area 12 and is seen to be positioned on a support 18, e.g. a tripod or the like, which permits the laser beam to be directed at any portion of the screen by providing freedom of motion in azimuth as well as in elevation. The tripod is provided with mechanical stops, such as stops 19a and 19b, which are capable of providing selected limits to the movement of the laser and which permit such movement to be reproduced precisely. In practice, a larger number of stops may be employed in azimuth and in elevation, or the movement of the laser may be recorded or programmed and reproduced by other than manual means, e.g. by using a servo-mechanism.

Figure 9:
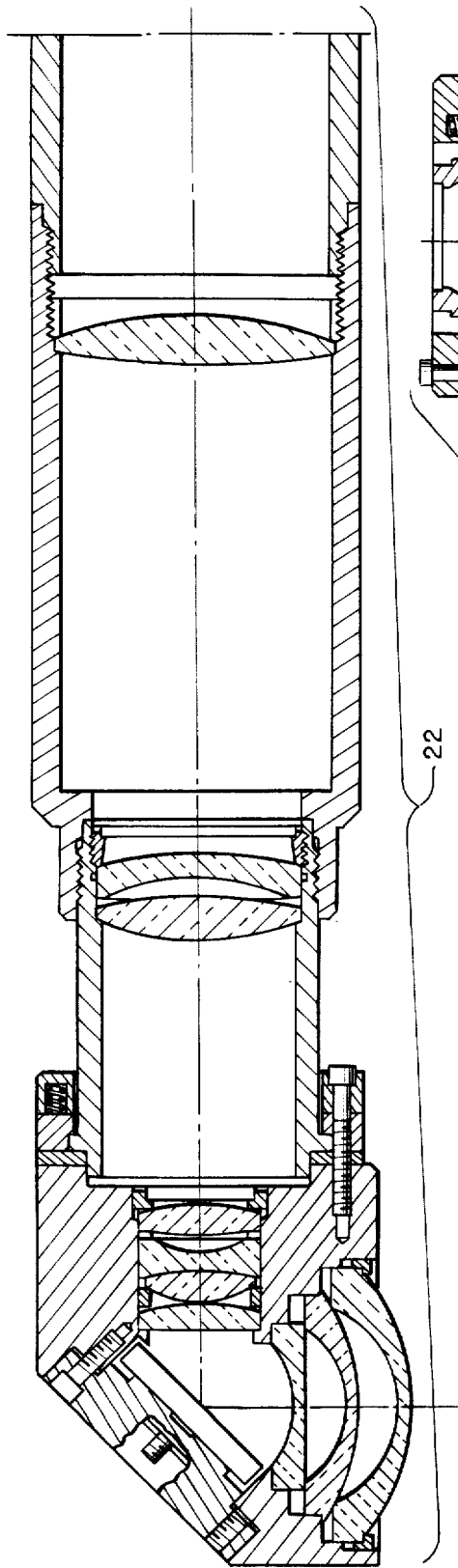
FIG. 9 is a sectional view of another portion of the optical system of FIG. 7.
Figure 8:
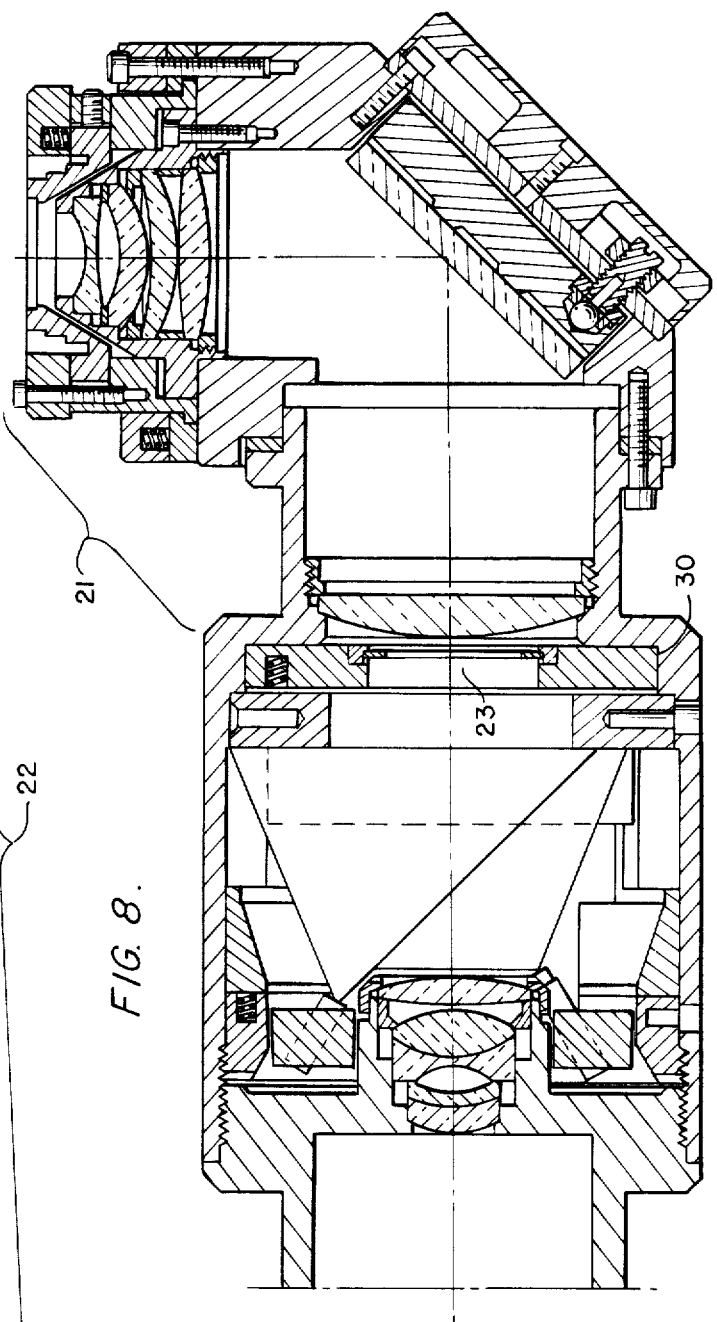
FIG. 8 is a sectional view of a portion of the optical system of FIG. 7.

As shown in FIG. 7, each optical system includes a light valve projector 24 and a lens 20. FIG. 8 illustrates a portion of lens 20, which is seen to include an intermediate image plane 23 and an attenuator carrier 30. Lens 20 further comprises a relay optics lens group, generally indicated at 21 in FIG. 8, and a projection lens group, generally indicated at 22 in FIG. 9.

Attenuator carrier 30 is shown in greater detail in exploded view in FIG. 10. A master plate 31 is adapted to receive a carrier plate assembly 38, which itself comprises carrier plate 32 and carrier plate cover 33. Carrier plate 32 contains a recess 34 adapted to hold an attenuator 40. A pair of alignment and retention pins 35a and 35b extend through holes 42a and 42b in attenuator 40 and through holes 36a and 36b in cover 33. The carrier plate assembly 38 is secured by inserting it in a slot in master plate 31 through an opening in lens 20, not shown in the drawing. Attenuator 40 contains an aperture area 41 which controls the outline and/or attenuation of the image projected by lens 20.

Figure 2:
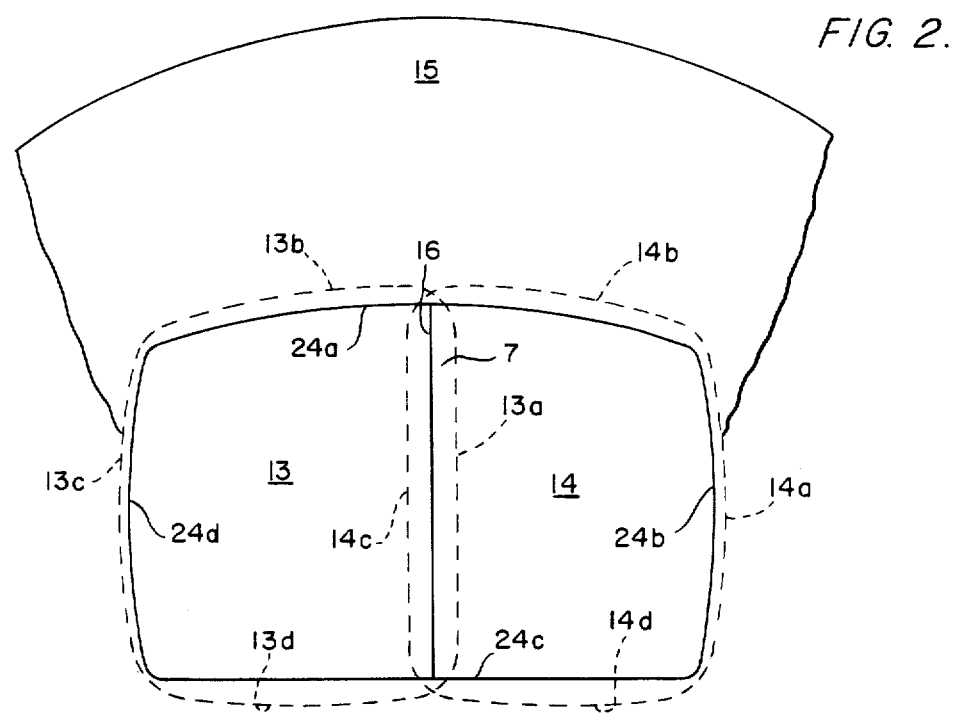
FIG. 2 is an elevation view of an exemplary mosaic image projected by the apparatus of FIG. 1.

To illustrate the inventive method in accordance with the embodiment under discussion, let it be assumed that light is projected at screen 15 through optical systems 10 and 11, neither of which has a field stop inserted in an intermediate plane thereof. Image areas 13 and 14, as shown in FIG. 2, have an undesirable area of overlap 7 between them. To eliminate the overlap, the spot of a narrow laser beam produced by laser device 17 is used to trace at least the desired common boundaries between the adjacent image areas. Preferably the desired configuration of each image area 13 and 14 and the desired common boundary 16, which lies between the boundaries 13a and 14c respectively, are initially traced as part of the desired overall outline of the two image areas. The desired outline further includes line portions 24a–24d, all as shown in FIG. 2. During this step, overlap 7 between image areas 13 and 14 is readily determinable by projecting light at screen 15 through optical systems 10 and 11. Mechanical stops such as 19a and 19b, which are capable of providing limits to the movement of the beam in the horizontal plane, and other stops (not shown) for the vertical plane, are set during the initial tracing step to facilitate the subsequent duplication of the initially traced outline.

After the mechanical stops have been set, a section of light-sensitive material is placed into attenuator recess 34 of each carrier plate assembly 38. By way of example and without limitation, each section of light-sensitive material may consist of a glass plate coated with a photographic emulsion. In a photographically dark environment, alignment and retention pins 35a and 35b are inserted into small pre-formed holes in the glass plates or their frames, thereby securing the plates to the assembly upon the addition of cover 33. The operator then darkens the room which contains the multi-channel display apparatus and inserts carrier plate assemblies 38, each containing the aforesaid section of light sensitive material, i.e. the glass plate and its emulsion, into optical systems 10 and 11. As previously explained in connection with FIG. 4, each section is now positioned in an intermediate image plane 23 of its corresponding optical system.

Using the laser beam spot, the operator next traces through the outline that was traced in the initial tracing step. This step is referred to as exposure tracing because it selectively exposes each section to light produced by the beam spot and emanating from, i.e. reflected from, screen 15. The reflected light reaches the respective sections by way of optical systems 10 and 11 respectively. The mechanical stops such as 19a and 19b cause the exposure tracing step to precisely duplicate the motion of the initial tracing step. Thus, the exposure tracing step records a line pattern as a latent photographic image on each glass plate-carried emulsion, which corresponds to the initially traced desired boundaries of image areas 13 and 14 and which further includes common boundary 16.

Following the exposure tracing step, carrier plate assemblies 38 are removed for processing while preventing further exposure of the emulsions. The emulsions are then developed in order to fix the line pattern on each glass plate and to render it visible. To prepare field stop attenuators, area 25 on each glass plate, i.e. the area outside the visible line pattern 29, is masked or painted to render it opaque to light. Alternatively, if the light sensitive material on which pattern 29 appears is opaque, e.g. as would be the case where a photograhic film is used, the field stop attenuator processing will entail cutting along line pattern 29 to provide aperture 41 as an actual hole in the opaque material.

When the field stop attenuators are returned to their respective optical systems, alignment and retention pins 35a and 35b assure that each attenuator 40 is located in the correct position, i.e. in the same relative position as was the case for the unexposed glass plate. Under these conditions the boundary of each aperture 41—whether the aperture consitutes a transparent portion of the glass plate or an actual hole—coincides precisely in position and in configuration with the line pattern previously recorded on the light sensitive material as a latent photographic image.

It will be clear that the method described above is not limited to multi-channel display apparatus using a plurality of separate optical systems. The method is likewise applicable to single-channel display apparatus having only one optical system, for example where it is desired to control the shape or location of the single image area accurately. A particular advantage of the method of the present invention, beneficial in both single-channel and multi-channel display apparatus, lies in its ability to provide a field stop attenuator which compensates for distortion introduced by irregularities in an optical system and irregularities of the surface of the screen, which may cause the projected configuration of an image area to differ from the configuration of the apertured area of the field stop attenuator.

Where a plurality of field stop attenuators is used in multi-channel projection apparatus, each provided in accordance with the inventive method described above, a mosaic image will be projected onto the display area in which the separate image areas combine to form what appears as a continuous picture. The apparent continuity stems from the fact that adjacent image areas are caused to share a precise common boundary with no overlap or gaps therebetween.

It will be noted that the present invention embodies a number of significant advantages over prior art methods. For example, the invention permits line patterns to be recorded simultaneously on a plurality of light sensitive sections. This not only assures greater accuracy in the location of common boundaries, but it also permits all the field stop attenuators for the same multi-channel projection apparatus to be prepared at one time using a method which requires a relatively small number of operations.

Further, the method itself is relatively simple so that no undue skill on the part of the operator is required. All that is necessary is that the operator determine the areas of overlap on the screen between adjacent unmodified images; that he trace the outline of each desired image area, including the common boundary between adjacent images; and that he retrace the same outline, using previously set stops, while exposing a section of light-sensitive material to light received from the screen. The actual field stop attenuator with the desired aperture can then be provided in a relatively simple manner. A further advantage of the method in accordance with the present invention resides in the fact that relatively little additional equipment is required to practice the method. Thus a multi-channel display apparatus already contains the necessary optical systems. By using each optical system in reverse to prepare the attenuator, i.e. as a camera system between the screen and the section of light-sensitive material, the only further equipment required is apparatus for generating the narrow light beam and for reproducibly tracing through a desired outline.

A further embodiment of the present invention is directed to a method for providing a neutral density attenuator which is capable of modifying a projected image such that the image area has uniform brightness throughout. As shown in FIG. 4, a picture is projected by optical system 10 onto screen 15 without the use of an attenuator, such picture being observed by an observer at location 28. In FIG. 4 the projector is shown to be on the same side of screen 15 as observer 28. It will be clear to those skilled in the art that optical system 10 could be positioned for rear projection with an appropriate screen. Even though the light provided by light valve projector 24 (FIG. 7) in optical system 10 may illuminate the lens 20 of optical system 10 with uniform brightness, the picture seen by the observer results from light passing through lens 20 and emanating from the screen. The term emanate as used here means that the observer sees light reflected by or transmitted through the screen depending upon the location of optical system 10. Thus, the image will not necessarily be perceived as having uniform brightness throughout, because of extraneous factors such as the relative positions of the projector and observer, the shape and coating of the screen viewing surface and non-uniform lens transmission characteristics which distort the relative brightness of different parts of an image area relative to the intended image. The non-uniform illumination perceived by the observer may be corrected by means of a neutral density attenuator 50, such as shown in FIG. 6. Attenuator 50 performs a two-dimensional attenuation function, as schematically indicated in the drawing by shaded portions 26. Specifically, portions of the image on the screen that emanate light with excess brightness are attenuated by portion 26. Each such area reduces the amount of transmitted light through a defined, localized portion of the attenuator. The overall result is to provide a flat field image for the observer, i.e. an image having non-distorted brightness throughout. Thus, neutral density attenuator 50 filters a projected image in accordance with the two-dimensional attenuation function of the attenuator.

In practicing the method to provide a neutral density attenuator, a section of light-sensitive material, such as a glass plate coated with a photographic emulsion, is placed into attenuator recess 34 of carrier plate assembly 38, as previously described with respect to FIG. 10. Carrier plate assembly 38 which contains the unexposed emulsion, is inserted into optical system 10 at intermediate image plane 23. Next, the screen is illuminated by a light source 27 (FIG. 5), which uniformly floods, i.e. provides uniform illumination on, at least the area of screen 15 which corresponds to the image area projected by optical system 10. It will be understood that optical system 10 need not be positioned in front of screen 15; but that rear projection on an appropriate screen may be employed. In either case, light emanating from the screen is directed to the emulsion on the glass plate at image plane 23 in FIG. 5. Thus, the emulsion is exposed for a period sufficient to record the two-dimensional attenuation function as a latent photographic image thereon. Proper exposure is determined to have occurred when a latent photographic image is formed on that portion of the emulsion which receives light from the dimmest area of the screen. The more brightly illuminated portions of the emulsion will be recorded with greater intensity under these conditions.

After exposure, carrier plate assembly 38 is removed and further exposure of the emulsion is prevented during the removal. The emulsion is then developed to fix the two-dimensional attenuation function thereon, i.e. to fix the latent photographic images recorded in various localized areas thereof and to render them visible. In the case of the glass plate, portions thereof, as shown at 26 in FIG. 6, will appear darkened in varying degree so as to attenuate the light transmitted therethrough. Depending on the brightness of the illumination on a particular portion of the emulsion during the exposure step, different localized portions 26 will have different degrees of transparency. This completes the required processing of the neutral density attenuator where a glass plate is used. Where a non-transparent light-sensitive material is used, subsequent steps are required to transfer the two-dimensional attenuation function to a transparent medium. Subsequently, neutral density attenuator 50 is placed at intermediate image plane 23 in optical system 10, using alignment and retention pins 35a and 35b to assure that it is located in the correct position.

While preferred embodiments of the present invention have been shown and described herein, it will be obvious to those skilled in the art that such embodiments are provided by way of example only. Numerous variations, changes, departures, substitutions and partial and full equivalents will now occur to those skilled in the art without departing from the invention. Accordingly, it is intended that the invention be limited only by the spirit and scope of the appended claims.

What is claimed is:

1. A method for modifying the image projected onto a display area by an optical system to obtain an image having desired characteristics, said method comprising the steps of:

positioning a section of light-sensitive material in said optical system;

projecting light onto said display area from a location external to said optical system to provide information concerning said desired characteristics;

exposing said section of light-sensitive material to light from said display area directed to said section through said optical system, said exposure step being adapted to record on said section of light-sensitive material said information contained in the light emanating from said display area;

processing said section of light-sensitive material to render said information visible thereon, said processed section forming an attenuator adapted to modify light passing therethrough in accordance with the visible information thereon; and installing said attenuator in said optical system in the same position formerly occupied by said section of light-sensitive material.

2. The method of claim 1 wherein said projected light is provided by the spot of a narrow light beam while said spot traces desired boundaries of said projected image;

said exposure step latently recording the line pattern traced by said spot; and said processing step rendering said section opaque to light in an area thereof external to the line pattern traced by said spot to provide the desired attenuation of a field stop attenuator.

3. The method of claim 1 wherein said projected light is provided by a light source which floods said display area with a uniform field of light;
- said exposure step latently recording in different localized portions of said section in accordance with the variation in the brightness of light directed to said portions; and
- said processing step rendering said localized portions variously darkened to provide the desired neutral density attenuation to compensate for distortion in the observed brightness of said projected image.

4. A method for providing field stop attenuators in the respective optical systems of multi-channel display apparatus adapted to project an image area in each channel onto a common screen, said method comprising the steps of:
- positioning a section of light-sensitive material in an intermediate image plane of each of said optical systems;
- tracing at least selected common boundaries between adjacent image areas on said screen with the spot of a narrow light beam;
- simultaneously exposing said sections to light from said screen directed to each section by the corresponding optical system during said tracing step to record on each of said sections a latent line pattern corresponding to said traced boundaries;
- processing each of said sections to provide a field stop attenuator wherein said recorded line pattern on each of said sections defines the inner edge of an opaque area on said section surrounding a light-transmitting area; and
- positioning each of said field stop attenuators in said intermediate image plane of its corresponding optical system such that said inner edge substantially coincides with the corresponding line pattern as it was positioned during said tracing step;
- whereby said light-transmitting area of each of said sections determines the configuration of the image area projected onto said screen by the corresponding optical system, and whereby adjacent projected image areas adjoin each other along a common boundary without gaps or overlap therebetween.

5. A method as set forth in claim 4 wherein each of said sections of light-sensitive material comprises a glass plate coated with a photographic emulsion, said processing step comprising the further steps of:
- developing each of said emulsions to render said recorded, latent line pattern visible on said glass plate; and
- painting the portion of each of said glass plates outside said line pattern to establish said opaque area thereon.

6. A method as set forth in claim 4 wherein said light beam is a laser beam directed at said screen from the same general area to one side of said screen where said optical systems are positioned.

7. A method as set forth in claim 4, wherein during said exposure step each of said sections of light-sensitive material is retained in said intermediate image plane of the corresponding optical system by a plurality of positioning pins and mating holes; and
- wherein said positioning step uses said positioning pins and mating holes to locate each of said field stop attenuators in its corresponding optical system.

8. A method as set forth in claim 7, wherein said tracing step further traces the outline of each of said image areas.

9. A method for providing field stop attenuators for the respective optical systems of multi-channel display apparatus, each of said optical systems being adapted to project an image to a common screen, said method comprising the steps of:
- projecting light onto said screen through said optical systems in the absence of any field stop attenuators to determine regions of overlap between adjacent image areas;
- initially tracing the spot of a laser beam on said screen at least through each of said regions of overlap, said spot being selectively moved through the approximate center of each of said overlap regions;
- positioning a section of light-sensitive material in an intermediate image plane of each of said optical systems;
- exposure tracing with said spot on said screen the line pattern traced during said initial tracing step;
- simultaneously exposing all of said light-sensitive sections during said exposure tracing step to light from said screen directed to each section by the corresponding optical system, said exposure causing a latent line pattern to be recorded on each of said sections corresponding to said traced line pattern;
- processing said sections to provide a field stop attenuator for each of said optical systems, each of said attenuators including an aperture having an edge which follows the corresponding recorded line pattern;
- positioning each of said field stop attenuators in said intermediate image plane of its corresponding optical system such that said aperture edge of said attenuator substantially coincides with the corresponding recorded line pattern as it was positioned during said exposure tracing step;
- whereby each of said apertures defines the configuration of the image area projected to said screen through the corresponding optical system, and whereby adjacent image areas projected onto said screen adjoin each other along a common boundary without gaps or overlap therebetween.

10. A method for making a field stop attenuator for use in an intermediate image plane of an optical system adapted to project an image, said method comprising the steps of:
- positioning a section of light-sensitive material in said intermediate image plane so as to be capable of receiving light from said screen through said optical system;
- exposure tracing the desired boundaries of said image area on said screen with the spot of a narrow light beam;
- exposing said section during said exposure tracing step to light reflected from said screen and directed to said section through said optical system, said exposure causing a latent line pattern to be recorded on said section corresponding to said traced boundaries;
- processing said section to provide a field stop attenuator wherein a light-transmissive area defined by said line pattern is surrounded by an opaque area; and
- positioning said field stop attenuator in said intermediate image plane of said optical system such that the edge of said light-transmissive area substantially coincides with said recorded line pattern as it was positioned during said exposure tracing step.

11. A method for providing a neutral density attenuator in an optical system of display apparatus adapted to project an image to a screen, said method comprising the steps of:

positioning a section of light-sensitive material in an intermediate image plane of said optical system;

illuminating said screen with a uniform field of light from an observation area spaced from said optical system;

exposing said section to light from said illuminated screen directed to said section by said optical system, said exposure step being effective to record latent images in localized portions of said section with an intensity that will vary in accordance with the variation in brightness of light directed to these portions;

developing said section to provide a transparent neutral density attenuator wherein said localized portions are darkened to a varying degree; and positioning said neutral density attenuator in said intermediate image plane of said optical system in the same position as occupied by said section during said exposure step.

12. The method of claim 11 wherein said section is a glass plate coated with a photographic emulsion; and wherein said glass plate is adapted to be repeatably placed in the same position in said intermediate image plane.

13. The method of claim 11 wherein said optical system is localized on the opposite side of said screen from which said screen is illuminated.

* * * * *